United States Patent
Hunter et al.

(10) Patent No.: US 7,860,750 B2
(45) Date of Patent: Dec. 28, 2010

(54) SYSTEM AND METHOD FOR ORDER FULFILLMENT DECISIONS

(75) Inventors: Jason A. Hunter, Orem, UT (US); Brian K. Andrus, Spanish Fork, UT (US); David A. Duncan, Orem, UT (US); Michael A. Scalora, Orem, UT (US); Jeffrey DeMoss, Redwood City, CA (US); Walter M. Holladay, Lindon, UT (US)

(73) Assignee: Intuit Inc., Mountain View, CA (US)

( * ) Notice: Subject to any disclaimer, the term of this patent is extended or adjusted under 35 U.S.C. 154(b) by 1289 days.

(21) Appl. No.: 11/406,093

(22) Filed: Apr. 18, 2006

(65) Prior Publication Data

US 2007/0244765 A1    Oct. 18, 2007

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

| | | | |
|---|---|---|---|
| 5,758,329 A | 5/1998 | Wojcik et al. | |
| 6,587,827 B1 | 7/2003 | Hennig et al. | |
| 6,889,197 B2 | 5/2005 | Lidow | |
| 2004/0210621 A1* | 10/2004 | Antonellis | 709/200 |
| 2006/0009989 A1 | 1/2006 | McCormick | |
| 2006/0064344 A1 | 3/2006 | Lidow | |
| 2007/0203810 A1* | 8/2007 | Grichnik | 705/28 |

OTHER PUBLICATIONS

David Biederman, Seeking fulfillment, Traffic World, Newark: Oct. 4, 1999. vol. 260, Iss. 1; p. 22, downloaded from ProQuestDirect on the Internet on Mar. 2, 2010, 9 pages.*

* cited by examiner

*Primary Examiner*—James Zurita
(74) *Attorney, Agent, or Firm*—Osha • Liang LLP

(57) ABSTRACT

An order fulfillment tool may indicate fulfillability information for a plurality of open orders and receive user input specifying one or more orders for potential fulfillment. In response, the order fulfillment tool may indicate revised fulfillability information for orders not specified for potential fulfillment according to the effects on a current inventory if the specified orders were fulfilled. The order fulfillment tool may also recommend orders for potential fulfillment according to user-specified order fulfillment criteria and indicate revised fulfillability information for orders not recommended for potential fulfillment. Such an order fulfillment tool may also receive user input specifying fulfillment levels for individual items of orders and update fulfillability information for other orders according to the effect of the individual fulfillment levels.

20 Claims, 10 Drawing Sheets

Order Fulfillment Tool

Open Orders

Sort [By Order Number]

| Check To Fulfill | Fulfillable | Order Date | Ship Date | Order Number | Customer / Job # | Open Amount | To Fulfill Amount | Partially Invoiced |
|---|---|---|---|---|---|---|---|---|
| ☐ | ⊗ | 1/7/2006 | 1/14/2006 | 86791 | ABC Corp. / #10102 | 151.78 | 0.00 | |
| ☐ | ● | 1/9/2006 | 1/13/2006 | 86792 | ABC Corp. / #10107 | 6,875.00 | 6,875.00 | Yes |
| ☐ | ◐ | 2/2/2006 | 2/6/2006 | 86793 | XYZ Corp. / #16801 | 500.00 | 275.00 | |
| ☐ | ◐ | 2/13/2006 | 2/16/2006 | 86794 | XYZ Corp. / #6942 | 33,937.01 | 21,065.00 | Yes |
| ☐ | ● | 2/14/2006 | 2/17/2006 | 86795 | IJK Corp. / #00107 | 5,787.90 | 5,789.90 | |

[Clear Choices] [Choose For Me ▼] [Save Scenario] [Load Scenario]

Detail Of Selected Order:

| Fulfillable | Item | Description | Ordered | Invoiced | Open | Unallocated | To Fulfill | Rate | To Fulfill Amount |
|---|---|---|---|---|---|---|---|---|---|
| ◐ | 1500-PM | Power Module, 15W | 3 | 0 | 3 | 2 | | | |
| ● | Pool Cover: 301 | Pool Cover, Aqua | 2 | 0 | 2 | 2 | | | |
| ◐ | Pool Cover: 302 | Pool Cover, Dark Blue | 3 | 0 | 3 | 3 | | | |
| ● | Pool Cover: 303 | Pool Cover, Light Blue | 2 | 0 | 2 | 16 | | | |

FIG. 4

SYSTEM AND METHOD FOR ORDER FULFILLMENT DECISIONS

BACKGROUND

The present invention is directed to computer systems, and more particularly, to computer-implemented tools for managing orders and order fulfillment.

Typically, retailers, wholesalers, and other product distributors maintain an inventory of items that may be ordered by customers (both internal and external) or clients. Similarly, manufacturers generally maintain an inventory of parts and/or materials for use to manufacture various products. Additionally, warehouses, distribution centers, packing facilities, and other order fulfillment centers may also maintain inventories of items, parts, or materials. Orders from customers (or clients) are fulfilled from the current inventory of items. Frequently, a company receives more orders than can be fulfilled from a current inventory. Thus, the company must determine which orders to fulfill and ship and which orders to hold until further inventory becomes available.

Sometimes order fulfillment is performed manually. Additionally however, a person tasked with fulfilling and shipping orders uses one or more software tools to aid in fulfilling the orders. Traditionally, tools for aiding order fulfillment automatically choose orders to fulfill based on a single, system-wide policy, such as oldest order first.

SUMMARY

An order fulfillment tool as described herein may allow a user to select orders for potential fulfillment from current inventory and to see the effect of fulfilling the selected orders on the fulfillability of other orders.

In some embodiments, an order fulfillment tool may be configured to display fulfillability information for each open or pending order and to determine the fulfillability information according to a current inventory of items. The order fulfillment tool may also be configured to receive user input specifying one of the orders for potential fulfillment and to display revised fulfillability information for each of the other orders not specified for potential fulfillment based on the effect on the current inventory if the specified order was fulfilled. In other words, a user may be able to see the effect of fulfillment an order without actually fulfilling the order. A user may select various orders in turn for potential fulfillment to find the most appropriate orders to fulfill given the current inventory.

In some embodiments, the order fulfillment tool may be configured to allow a user to specify specific fulfillment levels for individual ordered items. For example, a user may be able to specify which items of an order to fulfill or may be able to specify how many of an item to fulfill for a particular order. Thus, if there are not enough of a particular item in the current inventory to fully fulfill two orders the user may be able to specify that both orders be partially fulfilled from the current inventory rather than fully fulfilling one order and partially fulfilling (or not at all) the other order.

Additionally, an order fulfillment tool may be configured to automatically recommend orders for fulfillment based on user customizable fulfillment criteria. The order fulfillment tool may recommend orders for potential fulfillment and show the results of fulfilling the recommended orders on other open orders.

In some embodiments, the order fulfillment tool may be configured to receive user input specifying and/or customizing order fulfillment criteria to use when recommending orders for potential fulfillment. For instance, in one embodiment, a user may specify that orders placed by preferred customers be fulfilled prior to other customers' orders. In another embodiment, a user may assign a priority to each order and specify that orders should be fulfilled according to the assigned priority. Similarly, a user may specify that orders that can be fully fulfilled should be fulfilled before orders that can only be partially fulfilled. Additionally, a user may specify that orders should be fulfilled according to the chronological order in which the orders were placed, according to the amount of revenue the orders will generate, or that orders that were partially fulfilled previously should be fulfilled before fulfilling new orders.

The order fulfillment tool may allow a user to change or customize the order fulfillment criteria and the order fulfillment tool may recommend different orders for potential fulfillment based on the modified order fulfillment criteria. In some embodiments, a user may first manually select one or more orders for potential fulfillment and then have the order fulfillment tool recommend ones of the remaining orders for potential fulfillment.

As will be described in more detail below, an order fulfillment tool may generate and display a user interface, such as a graphical user interface, for displaying fulfillability information regarding orders. The user interface may also be configured to receive user input regarding particular orders to fulfill, particular fulfillment levels of individual ordered items, and/or order fulfillment criteria to use when automatically recommending orders for potential fulfillment.

In one embodiment, the order fulfillment tool may be configured to save a potential order fulfillment scenario, including information regarding which orders are selected by the user or recommended by the order fulfillment tool for potential fulfillment so that a user may analyze various fulfillment strategies or scenarios before deciding on a particular order fulfillment strategy. Even without saving and loading different order fulfillment strategies, an order fulfillment tool may be configured to allow a user to specify and analyze the effect of fulfilling different orders first. Thus the order fulfillment tool may be configured to allow a user to view and analyze various "what-if" scenarios regarding order fulfillment.

Once the user has decided upon an order fulfillment strategy, such as by either manually selecting orders to fulfill, allowing the order fulfillment tool to recommend order to fulfill, or a combination of both, the order fulfillment tool may be configured to print packing slips, pick lists, and the orders themselves to aid in order fulfillment. Additionally, in some embodiments, the order fulfillment tool may also communicate (either directly or via one or more files) with other order and inventory support tools regarding order fulfillment. For example, in one embodiment, the order fulfillment tool may be configured to communicate information regarding the orders, and the items of those orders, being fulfilled to inventory tracking and management tools or to sales tracking and accounting tools.

BRIEF DESCRIPTION OF THE DRAWINGS

FIG. 4 illustrates one embodiment of a user interface for an order fulfillment tool, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
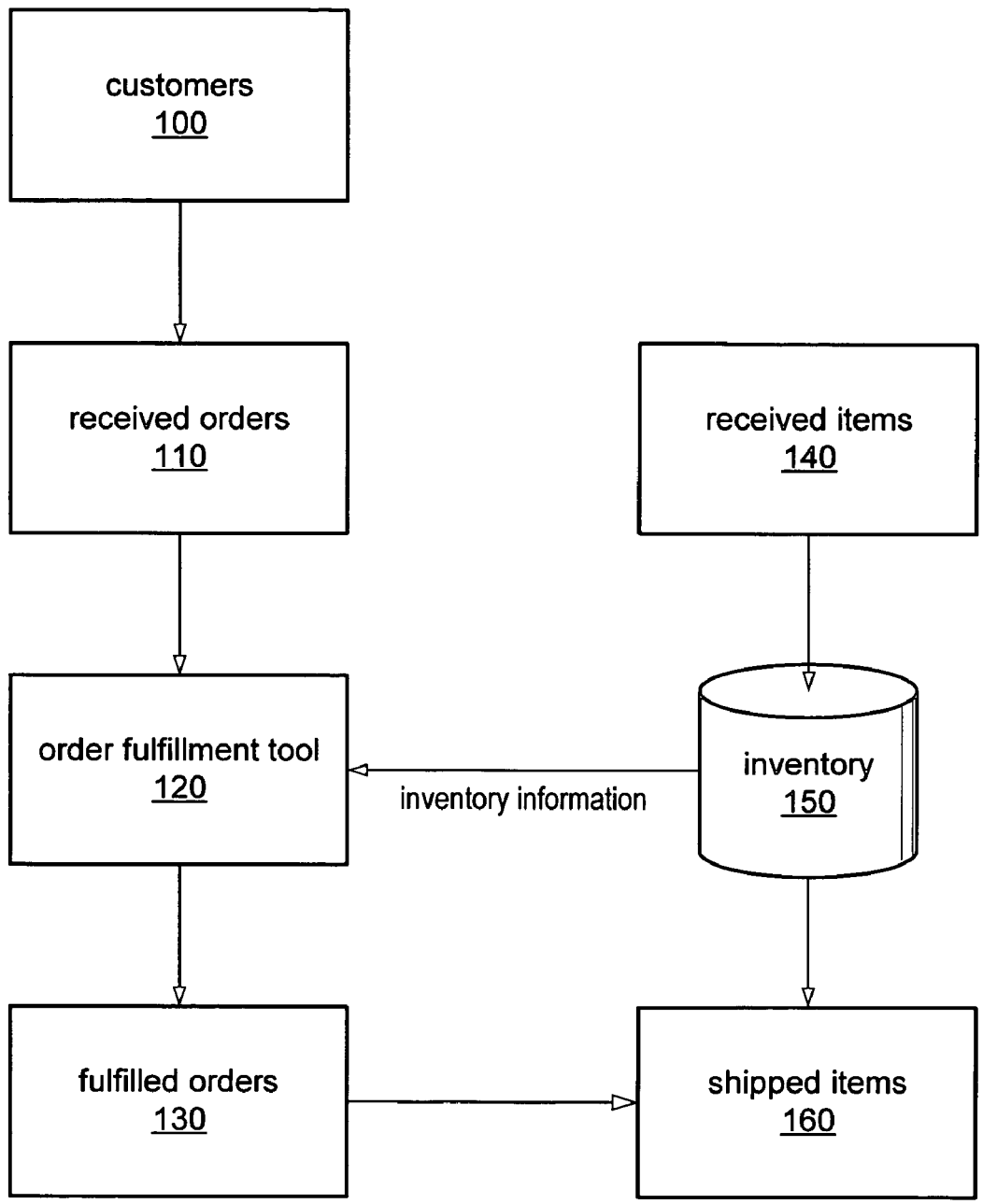
FIG. 1 is a block diagram illustrating the logical flow of information through an order fulfillment process including an order fulfillment tool, as described herein according to one embodiment.

As described above, an order fulfillment tool as described herein may allow a user to select orders for potential fulfillment from current inventory and to see the effect of fulfilling the selected orders on the fulfillability of other orders. FIG. 1 is a block diagram illustrating the logical flow of information through an order fulfillment process including such an order fulfillment tool, according to one embodiment. Customers 100 may place orders, such as received orders 110, that are to be fulfilled by an order fulfillment center. Additionally, received items 140 may be received by the order fulfillment center and recorded in inventory 150. In one embodiment, an order fulfillment tool 120 may be configured to display and analyze information regarding both the received orders 110 and the current inventory 150 of received items 140 in order to aid in fulfilling received orders 110. As mentioned above, an order fulfillment tool 120 may be configured to allow a user to manually select individual orders for fulfillment and may also be configured to automatically recommend orders for fulfillment based on user-specified order fulfillment criteria, as will be discussed in more detail below.

After the user has determined, either via manual selection, automatic recommendation by the order fulfillment tool, or a combination of both, which orders should be fulfilled from the current inventory, order fulfillment tool 120 may be configured to generate information, such as fulfilled orders 130, to aid the actual fulfilling of the orders. In some embodiments, order fulfillment tool 120 may generate printed versions of fulfilled orders 130 while in other embodiments, order fulfillment tool 120 may also be configured to communicate electronic versions of fulfilled orders 130, such as to sales, accounting and/or inventory tools.

In one embodiment, the order fulfillment tool 120 may be configured to generate pick lists to aid in locating and pulling from inventory the items for a particular order. Order fulfillment tool 120 may also be configured to generate packing slips and other printed order information for fulfilled orders 130. In some embodiments, however, order fulfillment tool 120 may be configured to communicate with other tools, such as inventory management, sales, and/or accounting tools in order to transfer information regarding fulfilled orders, the effect of fulfilling orders on the current inventory, potential revenue generated by the fulfilled orders, and/or other information pertaining to orders or order handling. Thus, orders may be received from customers and matched against received items 140 according to inventory 150 to determine which of received orders 110 to fulfill as fulfilled orders 130 and delivered to customers as shipped items 160.

While described herein mainly in reference to aiding in fulfilling customer orders by an order fulfillment center, an order fulfillment tool 120 as described herein may also be utilized within a single organization. For example, customer 100 may represent internal customers or departments and received orders 110 may represent development quotas and/or internal requirements for components necessarily for downstream development.

Figure 2:
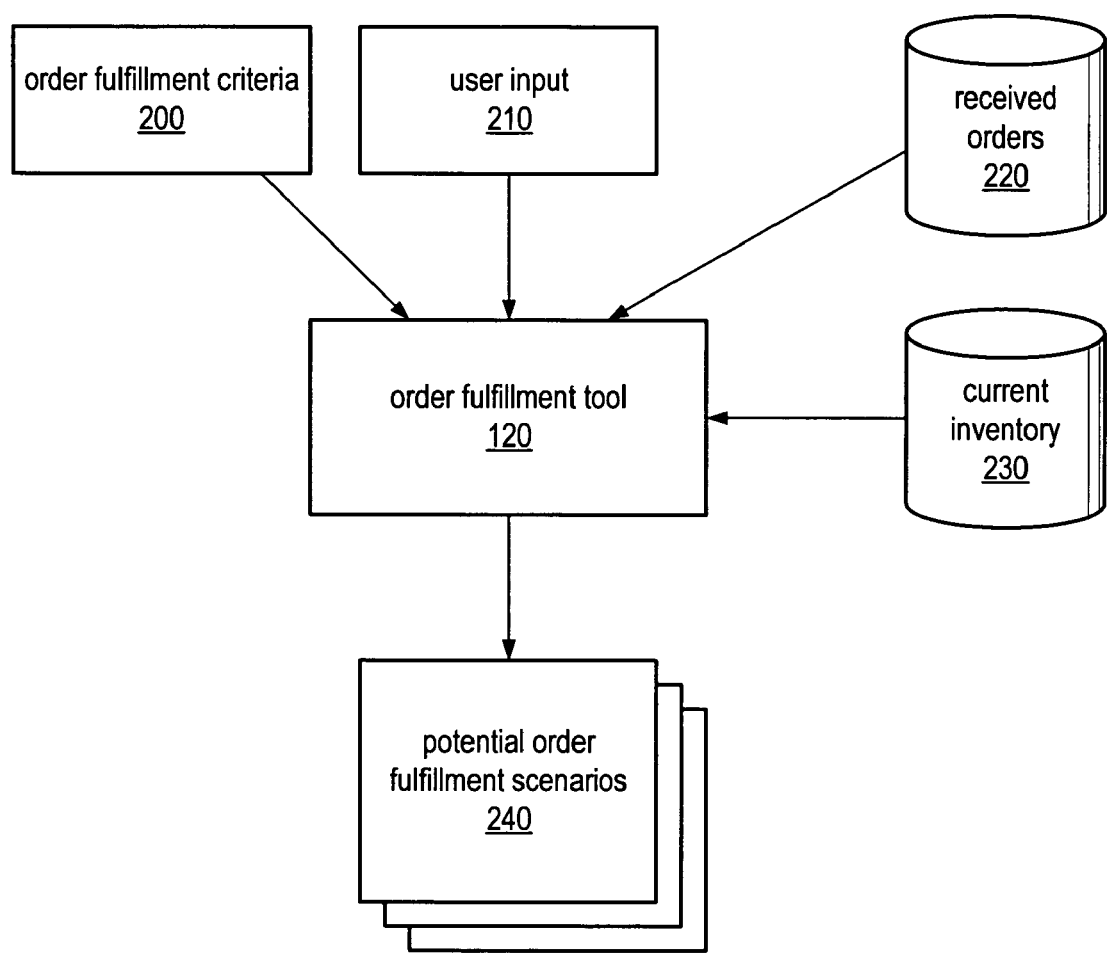
FIG. 2 is a block diagram illustrating one embodiment of an order fulfillment tool as described herein.

FIG. 2 is a block diagram illustrating one embodiment of an order fulfillment tool as described herein. An order fulfillment tool, such as order fulfillment tool 120, may receive order fulfillment criteria 200 and other user input 210 to be used when determining or recommending which orders could/should be fulfilled before other orders. As noted above a user may also specifically identify one or more orders for fulfillment and order fulfillment tool 120 may only recommend orders from among those orders not specifically identified by a user for fulfillment. Order fulfillment tool 120 may also receive information regarding received orders 220 and current inventory 230. For example, in one embodiment, order fulfillment tool may automatically receive information regarding received orders 220 from a separate order entry tool or, in another embodiment a user may manually input information regarding received orders 220 into order fulfillment tool 120. Similarly, order fulfillment tool 120 may receive information regarding current inventory 230, either electronically from an inventory management tool, manually via user input, or a combination of both, according to various embodiments.

In some embodiments, current inventory 230 may represent an electronic catalog or database of the items current in stock and ready to be shipped with fulfilled orders. However, please note that an order fulfillment tool, such as order fulfillment tool 120 described herein, may utilize any suitable format of inventory information. In some embodiments, order fulfillment tool 120 may be configured to communicate with a separate inventory management tool that provides information about a current inventory of items. In other embodiments, order fulfillment tool 120 may include an interface allowing manual inputting of inventory information. In general, any suitable method of maintaining and/or communicating inventory information may be utilized by order fulfillment tool 120, according to various embodiments.

Additionally, current inventory 230, as described and referred to herein may also include other items received by the order fulfillment center, but not yet stocked into general inventory. In some embodiments, order fulfillment tool 120 may be configured to take such received but not stocked items into account when displaying fulfillability information and when recommending orders for potential fulfillment. Fulfilling orders with items that have been received but not stocked may be referred to as received to ship. By using such (received but not stocked) items, the order fulfillment center may save time by not having to stock the items and them immediately pull them out of stock for shipping. Additionally, orders may be able to be shipped faster due to the time saved by not having to stock the items only to then immediately pick them out of stock for shipping. Thus, in some embodiments, current inventory 230 may also include items that are not currently stocked with general inventory and order fulfillment tool 120 may be configured to take such items into account when displaying fulfillability information and recommending orders for fulfillment.

As described above, order fulfillment tool 120 may, in some embodiments, be configured to allow a user to select various orders for potential fulfillment and to see the effect of fulfilling those orders on the fulfillability of the remaining orders before actually committing fulfilling any particular order for fulfillment. For instance, order fulfillment tool 120 may be configured to display fulfillability information regarding each of received orders 220. In some embodiments, a user may manually select an order for potential fulfillment and order fulfillment tool 120 may display revised fulfillability information for the remaining orders not selected or specified for potential fulfillment. For example, if there are two open orders that each include 10 instances of a particular item, but there are only 15 instances of that item in current inventory 230, order fulfillment tool 120 may initially display that either of the two orders could be fulfilled from current inventory. However, if the user selects one of the orders for potential fulfillment, order fulfillment tool 120 may then revise the displayed fulfillability information for the other order to indicate that, if the first order is fulfilled (thus using 10 of the 15 instances of the item from current inventory 230) that the second order would be fully fulfillable from current inventory 230.

In some embodiments, order fulfillment tool 120 may be configured to update or revise fulfillability information after each order selected by the user for potential fulfillment. In other embodiments however, order fulfillment tool 120 may be configured to allow the user to select multiple orders for potential fulfillment and may not update or display revised fulfillability information until the user specifically requests revised fulfillability information. Thus, in some embodiments, the user may be able to select multiple orders without having to wait for the order fulfillment tool to update the fulfillability information for all other orders between each selection. This may be especially beneficial in embodiments where the user desires to select multiple orders for potential fulfillment and where there are many other orders for which order fulfillment tool 120 must display revised fulfillability information.

Additionally, the user may be able to change which orders are selected for potential fulfillment and see the effect of fulfilling the newly selected orders on the fulfillability of other orders. For instance, in addition to the two items each including 10 instances of particular item used in the example above, perhaps received orders 220 also includes 3 other orders that each include only 5 instances of that particular item. Thus, in this example, fulfilling the three orders that each include 5 instances of the particular item may actually generate more total revenue that either of the two orders that include 10 instances of the item (esp. if the user does not desire to partially fulfill orders or cannot invoice for partially fulfilled orders). However, it may be more important to the user to fulfill one of the 10 item orders rather than all three of the 5 item orders due to other considerations, such as customer standing, order priority, order date, or other business reasons. For example, one of the 10 item orders may be from a preferred customer or from a customer that has paid extra for expedited fulfillment. Thus, a user may be able to determine the best strategy for fulfilling open orders according to a current inventory using order fulfillment tool 120 by selecting different order fulfillment strategies or scenarios and seeing the effects of fulfilling certain orders before other orders, according to various embodiments.

In other embodiments, the order fulfillment tool 120 may be configured to allow the user to specify individual fulfillment levels for particular items of orders rather than merely fulfill as much of the order as possible. For instance, continuing with the example from above, the user may specify that each of the 10 item orders should be partially fulfilled, such as each receiving 7 of the 15 items available. In some embodiments, a user may also be able to specify one or more orders not to be fulfilled, even if those orders could be fulfilled from the current inventory. For example, a user may decide not to fulfill an order from a certain customer due to business related issues, such as credit problems and/or other business factors that may effect the desirability of fulfilling an order. Thus, in one embodiment, order fulfillment tool 120 may be configured to allow a user to identify orders not to be fulfilled and order fulfillment tool 120 may not consider those orders when determining orders to recommend for potential fulfillment.

In some embodiments, a user may be able to save, via order fulfillment tool 120, various potential order fulfillment strategies, such as potential order fulfillment scenarios 240. Thus, a user may view and analyze various potential fulfillment strategies, saving them as he goes, and when satisfied, load and fulfill a desired fulfillment scenario without having to re-select or re-specify the particulars of that order fulfillment strategy. In some embodiments, potential order fulfillment scenarios 240 may only be stored in memory on the computer system executing the order fulfillment tool 120, while in other embodiments, potential order fulfillment scenarios 240 may be stored persistently, such as to a hard drive for later retrieval or for retrieval by another user. Thus, in one embodiment, one user, such as a manager, may determine an order fulfillment strategy to use, save it as a potential order fulfillment scenario 240 and another user, such as an order fulfillment agent may load the saved potential order fulfillment scenario in order to fulfill the specified orders.

Figure 3:
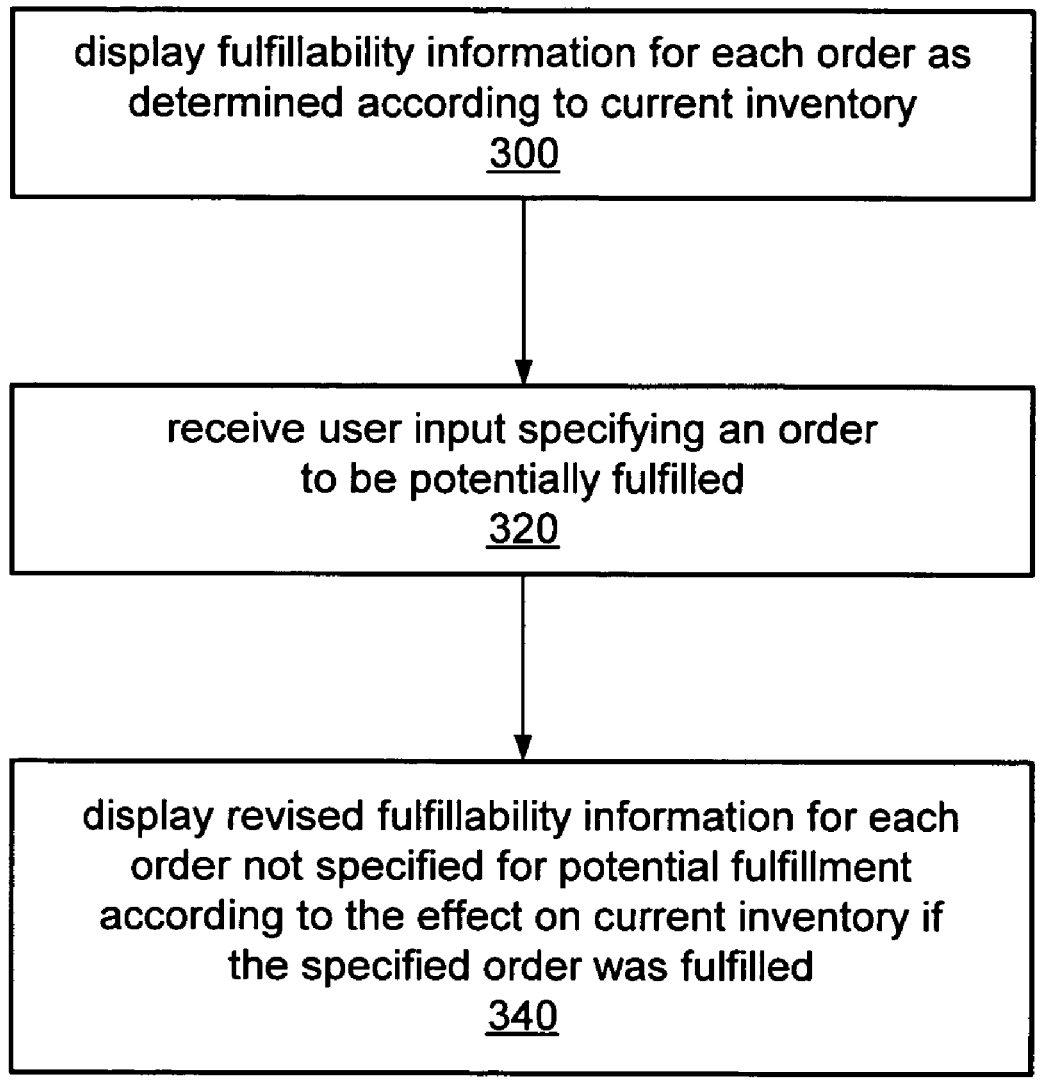
FIG. 3 is a flowchart illustrating one embodiment of a method for determining and displaying fulfillability information for orders, as described herein.

FIG. 3 is a flowchart illustrating one embodiment of a method for determining and displaying fulfillability information for orders, as described herein. As indicated by block 300, an order fulfillment tool, such as order fulfillment tool 120, may display fulfillability information for each order as determined according to a current inventory. As described above, order fulfillment tool 120 may display each open order and indicate whether or not that order can be fulfilled from a current inventory of items, such as from current inventory 230, described above. Initially, no order may be specified, selected or recommended for potential fulfillment and thus, order fulfillment tool 120 may determine whether each order can be fulfilled from current inventory 230 individually without regard to whether other orders can be fulfilled. For example, if current inventory 230 includes 10 instances of a particular item and there are 3 orders each including 7 instances of that item, order fulfillment tool 120 may indicate that any of those orders could be fulfilled from current inventory 230.

As indicated by block 320, order fulfillment tool 120 may receive user input specifying an order to be potentially fulfilled and may display revised fulfillability information for each order not specified for potential fulfillment according to the effect on the current inventory if the specified order was fulfilled. For instance, continuing the above example, if the user selects one of the three orders for potential fulfillment, thus using 7 of the 10 instances of the particular item, order fulfillment tool 120 may then display revised fulfillability information for the other two orders indicating that they cannot be fulfilled from current inventory 230 if the selected order is fulfilled. Thus, as described above, a user may be able to select various orders for potential fulfillment and see the effects of fulfilling those orders on the fulfillability of other orders.

FIG. 4 illustrates one embodiment of a user interface of an order fulfillment tool, as described herein. The user interface display illustrated in FIG. 4 may be described as having two logical sections, an upper section displaying information regarding each open order and a lower section displaying detailed information regarding an order selected in the upper section. The table 400 includes one line per open order and may display various items of information regarding the order, according to the embodiment illustrated in FIG. 4. For example, in one embodiment, order fulfillment tool 120 may display the information regarding open orders using a table of rows and columns, where each row may represent a single order and where different types of information are displayed in each column. For instance, table 400 of FIG. 4 displays open orders in rows 410, 415, 420, 425 and 430 and includes columns of information such as whether or not the order is Fulfillable, the Order Date, Ship Date, Order Number, Customer and Job information, an Open Amount, to Fulfill Amount and whether or not the order has previously been partially invoiced. Please note that in other embodiments, order fulfillment tool 120 may display different order related information and may display information in different formats and/or arrangements.

Thus, table 400 of FIG. 4 indicates that order number 86791 corresponding to customer ABC Corporation, job number 10102 was ordered on Jan. 7, 2006, was scheduled for shipment on Jan. 14, 2006, was partially invoiced, but has open amount of $151.78 remaining to be invoiced, but cannot be fulfilled from current inventory. Table 400 also includes a Check to Fulfill column allowing a user to manually select an order for potential fulfillment. In one embodiment, as illustrated by the Fulfillable column of table 400, order fulfillment tool 120 may indicate whether a particular order is fully fulfillable, such as by displaying a solid circle, partially fulfillable, such as displaying a half-filled circle, or not fulfillable, such a by displaying a hollow circle with an X over it. Please note that the user interface display illustrated in FIG. 4 represented only one possible embodiment of an order fulfillment tool and other embodiments may display the same or similar information as that displayed in FIG. 4 in other manners and using different arrangements, text, symbols, and/or colors.

Additionally, in some embodiments, order fulfillment tool 120 may include a Check to Fulfill column of check boxes allowing a user to manually select one or more orders for potential fulfillment. As described above, after a user has selected an order for potential fulfillment, order fulfillment tool 120 may display revised fulfillability information, or revise the already displayed fulfillability information, for order not selected for potential fulfillment. Thus, if the user selects the order displayed on row 415 for potential fulfillment by checking the corresponding checkbox in row 415, order fulfillment tool 120 may then update the information displayed in the other rows according to the effect that fulfilling the selected order would have on the current inventory of items and whether or not those orders not selected for potential fulfillment could be fulfilled if the order of row 415 were to be fulfilled.

Additionally, the user interface display illustrated in FIG. 4 may include a table 460 for displaying detailed information for an ordered selected in table 400. Thus, as illustrated by FIG. 4, a user may have selected the order of row 425. Please note that selecting an order for a more detailed display of information may not be the same as selecting an order for potential fulfillment. For example, a user may select an order for potential fulfillment only by checking the corresponding checkbox in the Check to Fulfill column, but may select the order for a more detailed display of order information by clicking a mouse anywhere else in the row displaying the order. Additionally, in some embodiments, a user may be able to select an order for a more detailed display of information using a keyboard to move a selection rectangle 495 between the order rows of table 400.

Order fulfillment tool 120 may display more detailed order information for a selected order in a separate area, such as in table 460 of FIG. 4. When displaying more detailed order information for a selected order, order fulfillment tool 120 may be configured to display fulfillability information for each item in the corresponding order. Thus, order fulfillment tool 120 may display each item of an order in a separate row (470, 475, 480 and 485) of table 460. Order fulfillment tool 120 may display various types of information regarding each ordered item in the corresponding row. For instance, in one embodiment, order fulfillment tool 120 may display whether each item is fulfillable from the current inventory. For example, table 460 includes a Fulfillable column that indicates whether each item of an order is fully, partially, or not fulfillable from the current inventory. Additionally, order fulfillment tool 120 may display information such as the title and description of each item, how many instances of that item are ordered, how many have been invoiced, how many of those items are current open in the current order, how many unallocated instances of that item are current in inventory, how many of that item to fulfill with the current order, the price per unit or Rate of the item and a To Fulfill Amount representing the amount of revenue corresponding to the number of that item to fulfill with the current order. In some embodiments, order fulfillment tool 120 may be configured to allow the user to specify or modify the To Fulfill amount in each row, thus allowing the user to customize how many of each item to fulfill with the current order. Changing the To Fulfill Amount for an item may cause order fulfillment tool 120 to update other cells of the row, such as the To Fulfill Amount for the corresponding row.

The user interface display illustrated in FIG. 4 may also include other user controls such as Sort criteria selection 490, which may allow a user to change the sort criteria used to display the orders in table 400, as will be described in more detail below. Additionally, order fulfillment tool 120 may include other user controls, such as Clear Choices button 435 that may clear all checkboxes in the Check to Fulfill column of table 400. In some embodiments, order fulfillment tool 120 may include a Choose For Me 440 control allowing the user to select an order fulfillment criteria used by order fulfillment tool 120 to recommend orders for potential fulfillment, as will be described in more detail below. Furthermore, order fulfillment tool 120 may also include buttons or other controls, such as Save Scenario button 445 and Load Scenario button 450, allowing the user to save and load various potential order fulfillment strategies or scenarios, such as to explore different "what-if" scenarios before committing any orders for fulfillment.

Thus, by including a user interface, such as that illustrated by FIG. 4, order fulfillment tool 120 may allow a user to analyze the effect of fulfilling one (or more) orders on the fulfillability of other orders before deciding or committing to fulfill any particular order. Additionally, order fulfillment tool 120 may allow the user broad flexibility regarding how to fulfill order through the user of an user interface such as the interface displayed in FIG. 4.

Figure 5:
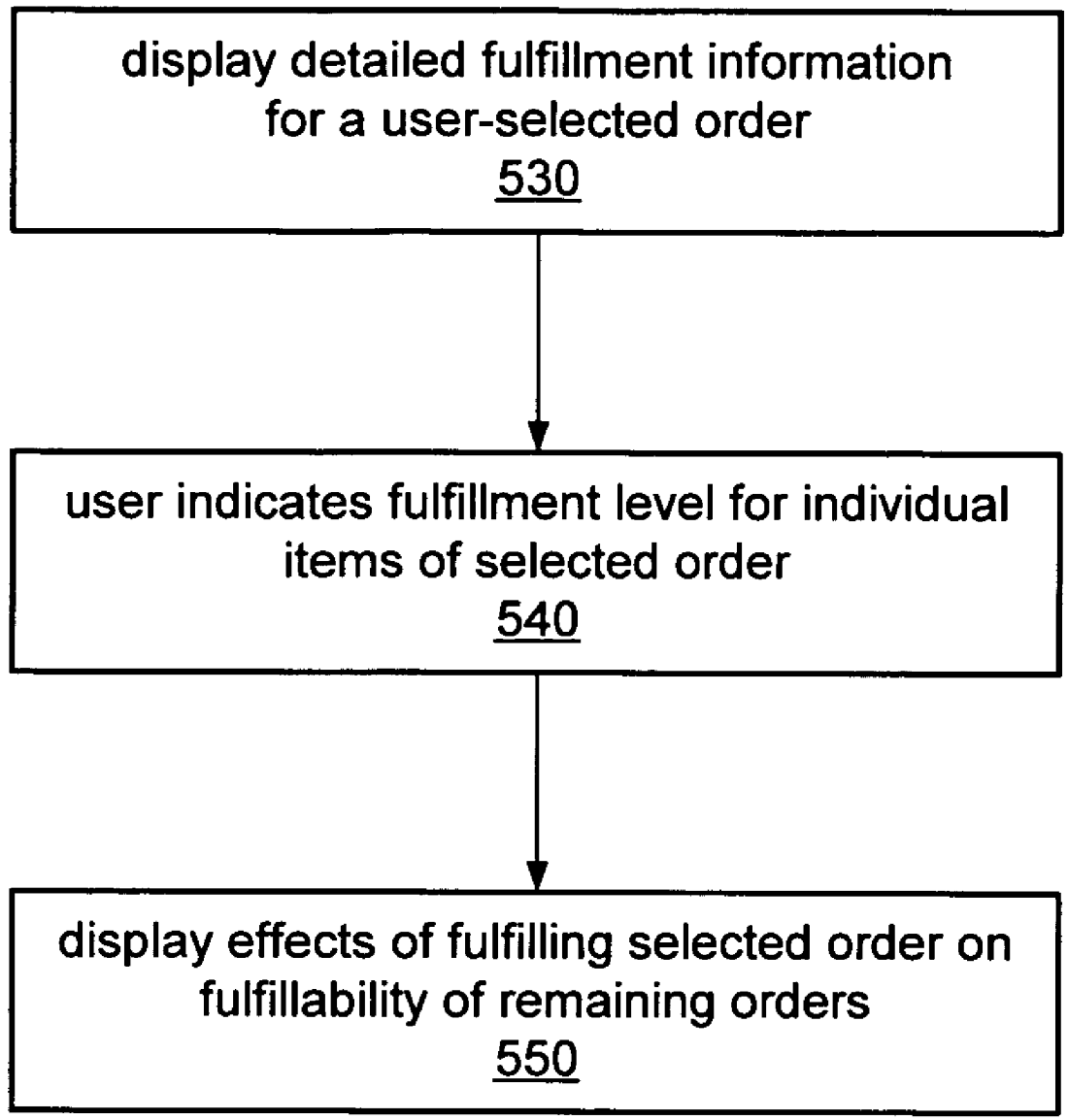
FIG. 5 is a flowchart illustrating one embodiment of a method for determining and displaying the effects of user-specified fulfillment levels for individual ordered items in an order fulfillment tool, as described herein.

FIG. 5 is a flowchart illustrating one embodiment of a method for determining and displaying the effects of user-specified fulfillment levels for individual ordered items in an order fulfillment tool, as described herein. As illustrated by block 530, an order fulfillment tool, such as order fulfillment tool 120 may display detailed fulfillment information for a user-selected order. As described above, order fulfillment tool 120 may display a user interface including a detailed order information display for a selected order that includes the fulfillability of each item of the order according to a current inventory. A user may indicate, specify or modify individual fulfillment levels for individual items of the selected order, as indicated by block 540 and order fulfillment tool 120 may display the effects of fulfilling the selected order according to the indicated fulfillment levels on the fulfillability of the remaining orders, as indicated by block 550. Thus, if a user specifies that a certain order should be fulfilled (or partially fulfilled) using 5 instances of a particular item, order fulfillment tool 120 may update the fulfillability of other orders including that particular item according to the effects of fulfilling (or partially fulfilling) the selected order.

Thus, referring to table 460 of FIG. 4, if the user indicates in row 480 that the selected order should receive all three of the unallocated instances of the dark blue pool cover, order fulfillment tool 120 may update the fulfillability of other orders that also include the dark blue pool cover. As described above, the user may indicate fulfillability levels for individual items by indicating the number of an ordered item to fulfill using the To Fulfill column of table 460 and order fulfillment tool 120 may update the fulfillability indicators in table 400 according to the effect on the current inventory if the selected order was fulfilled using the indicated fulfillability levels.

Figure 6:
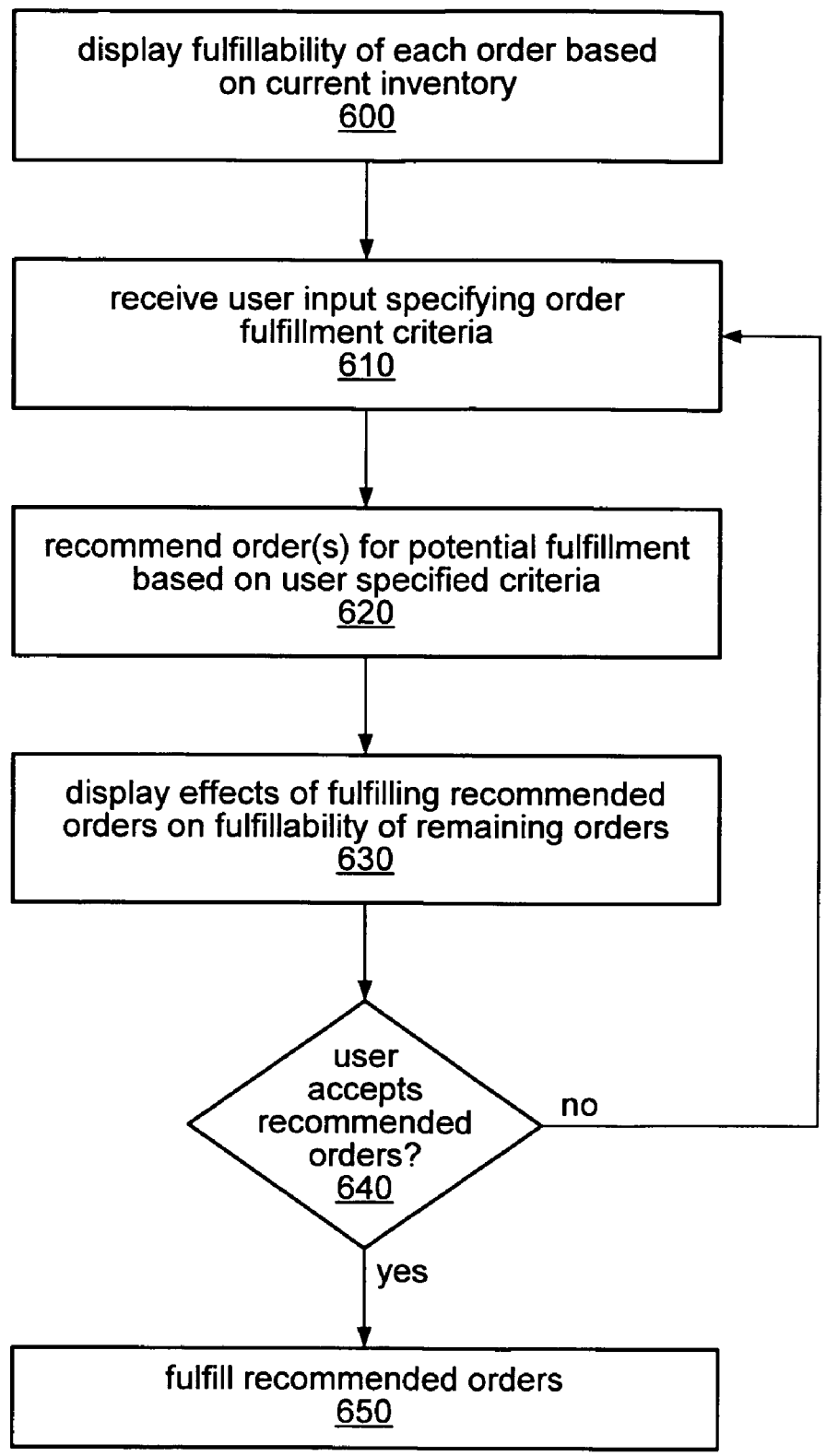
FIG. 6 is a flowchart illustrating one embodiment of a method for recommending orders for potential fulfillment according to user-specified order fulfillment criteria in an order fulfillment tool.

FIG. 6 is a flowchart illustrating one embodiment of a method for recommending orders for potential fulfillment according to user-specified order fulfillment criteria in an order fulfillment tool. As indicated by block 600, order fulfillment tool 120 may display the fulfillability of each open order based on the current inventory and may receive user input specifying order fulfillment criteria, such as order fulfillment criteria 200, as indicated by block 610. As described above, a user may specify or select order fulfillment criteria to be used by order fulfillment tool 120 to recommend orders for potential fulfillment. For example, a user may indicate that order fulfillment tool 120 should recommend orders with earlier order dates for fulfillment before orders with later order dates, in one embodiment. In another embodiment, a user may indicates that fully fulfillable orders with largest potential revenue should be fulfilled before other orders or that orders placed by preferred customers should be fulfilled ahead of orders placed by other customers. In some embodiments, order fulfillment tool 120 may be configured to allow a user to indicate with only orders that are fully fulfillable should be recommended for potential fulfillment or whether partially fulfillable orders may also be recommended. For instance, in one embodiment, a user may specify that orders placed by preferred customers be fulfilled prior to other customers' orders. In another embodiment, a user may assign a priority to each order and specify that orders should be fulfilled according to the assigned priority. Similarly, a user may specify that orders that can be fully fulfilled should be fulfilled before orders that can only be partially fulfilled. Additionally, a user may specify that orders should be fulfilled according to the chronological order in which the orders were placed, according to the amount of revenue the orders will generate, or that orders that were partially fulfilled previously should be fulfilled before fulfilling new orders In some embodiments, order fulfillment tool 120 may allow the user to specify more than one set of criteria in order, allowing more complex order fulfillment strategies to be used by order fulfillment tool 120 when recommending orders for potential fulfillment. For example, in one embodiment, a user may indicate that orders from preferred customers should be fulfilled first and then orders should be fulfilled according to the amount of potential revenue each order may generate.

After receiving user input specifying order fulfillment criteria, order fulfillment tool 120 may recommend one or more orders for potential fulfillment based on the user-specified order fulfillment criteria, as indicated by block 620. Order fulfillment tool 120 may compare the open orders to the user specified order fulfillment criteria to determine which orders match the specified criteria and then compare those matching orders with the current inventory to determine one or more orders to recommend for potential fulfillment. In addition to indicating the recommended orders to the user, order fulfillment tool 120 may also display the effects of fulfillment the recommended orders on the fulfillability of the remaining orders, as indicated by block 630. As described above regarding user-selected orders to fulfill, order fulfillment tool may display revised fulfillability information for orders not recommended for fulfillment according to the effect of fulfilling the recommended orders on the current inventory. In some embodiments, order fulfillment tool 120 may be configured to recommend as many orders as necessary to maximize use of the current inventory, including recommending partially fulfilling certain orders. In other embodiments, however, order fulfillment tool 120 may only recommend orders that can be fully fulfilled even if that does not maximize use of the current inventory. In yet other embodiments, whether or not to recommend partially fulfilling orders may be specified by the user via the user-specified order fulfillment criteria 200. In some embodiments, order fulfillment tool 120 may include a set of default order fulfillment criteria from which the user may select individual criteria. In other embodiments, order fulfillment tool 120 may allow the user to specify or build order fulfillment criteria "from scratch", and in yet other embodiments, order fulfillment tool 120 may include default criteria and allow the user to specify additional criteria "from scratch".

After reviewing the effects of potentially fulfilling the recommend orders, the user may decide not to accept that order fulfillment strategy, as indicated by the negative output of decision block 640 and thus, order fulfillment tool 120 may receive user input specifying different order fulfillment criteria. If, however, the user decides to accept the recommended order fulfillment strategy, as indicted by the positive output of decision block 640, order fulfillment tool 120 may fulfill the recommended orders, as indicated by block 650, such as by generating packing lists and pick lists for the recommend orders or by communicated the recommended order information to additional tools for order fulfillment.

Please note that in addition to fulfilling the recommend orders, as indicated by block 650, order fulfillment tool 120 may also include orders specifically identified by the user for fulfillment. As noted above, a user may manually indicate one or more orders for fulfillment and then may request that order fulfillment tool 120 recommend orders to fulfill from the remaining orders according to user-specified order criteria.

Figure 7:
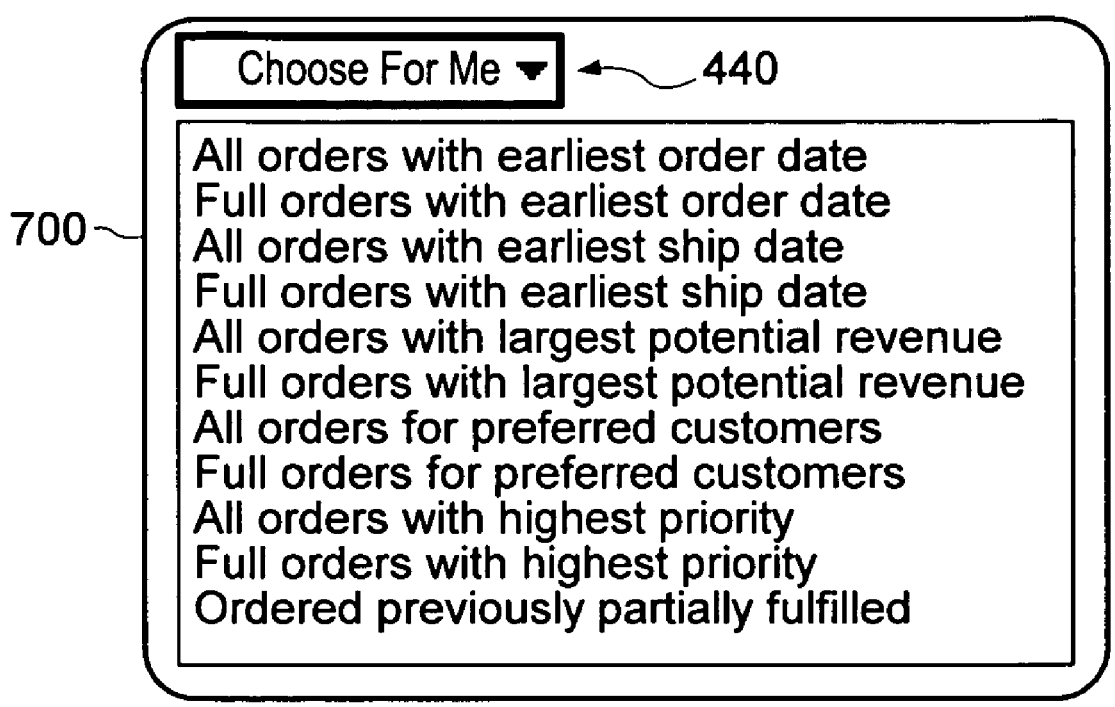
FIG. 7 is an illustration of an exemplary user interface for specifying order fulfillment criteria in an order fulfillment tool, as described herein.

FIG. 7 is an illustration of an exemplary user interface for specifying order fulfillment criteria in an order fulfillment tool, as described herein. As described above, order fulfillment tool 120 may be configured to allow a user to specify order fulfillment criteria used by order fulfillment tool 120 to recommend orders for potential fulfillment. In one embodiment, as illustrated by FIG. 7, order fulfillment tool 120 may include a user interface, such as button 440 that, which chosen, displays pop-down menu 700, allowing a user to select from among various order fulfillment criteria. For example, in one embodiment, the user may select to have all orders will the earliest order data be fulfilled first. Alternatively, a user may select to have orders from preferred customers fulfilled first. Thus, by selecting or otherwise indicating order fulfillment criteria, a user may request order fulfillment tool 120 to recommend orders for fulfillment. As noted above, in some embodiments, a user may also manually select individual orders for fulfillment, such as by using the check boxes in the Check to Fulfill column of FIG. 4. In some embodiments, order fulfillment tool 120 may also be configured to allow a user to specify order fulfillment criteria "from scratch" rather than select from predefined order fulfillment criteria. For example, in one embodiment, order fulfillment tool 120 may include a suitable order fulfillment criteria language or macro language allowing a user to specify order fulfillment criteria. In another embodiment, order fulfillment tool 120 may include a graphical user interface allowing a user to build order fulfillment criteria by selecting and arranging user interface element representing various order information elements and criteria. As the use of custom languages are well understood in the art, they will not be described in detail herein.

In response to a user selecting or specifying order fulfillment criteria, order fulfillment tool 120 may be configured to automatically recommend one or more orders for potential fulfillment according to the order fulfillment criteria. For example, in one embodiment, order fulfillment tool 120 may automatically fill in checkboxes in the "check to fulfill" column of table 400, illustrated in FIG. 4, indicating those orders that match the user-specified order fulfillment criteria and that can be fulfilled by the current inventory 230. In some embodiments, order fulfillment tool 120 may allow a user to specify whether only fully fulfillable orders or both fully and partially fulfillable orders may be recommended for potential fulfillment. Additionally, order fulfillment tool 120 may be configured to allow a user to specify more than one order fulfillment criteria, according to some embodiments. For example, a user may indicate that orders for preferred customers be fulfilled first and may also indicate that orders with the largest potential revenue be fulfilled next. In response to a user specifying multiple order fulfillment criteria, order fulfillment tool 120 may first determine which orders for preferred customers may be fulfilled from the current inventory 230 and then determine which of the remaining orders may be fulfilled from current inventory 230 after fulfilling the orders for preferred customers. Order fulfillment tool 120 may determine which of the remaining orders that may be fulfilled will result in the largest potential revenue and recommend those, according to one embodiment.

Order fulfillment tool 120 may allow a user to specify multiple order fulfillment criteria in various manners, according to various embodiments. For instance, in one embodiment, drop-down menu 700 may be configured to allow the user to select multiple menu items and use the order in which they were selected to prioritize the order fulfillment criteria. For example, a user may first select the menu item corresponding to all orders for preferred customers and then select the menu item corresponding to all orders with largest potential revenue. Please note, however, that there are numerous manners and possible user interfaces for allowing a user to specify multiple order fulfillment criteria, according to various embodiments.

Figure 8:
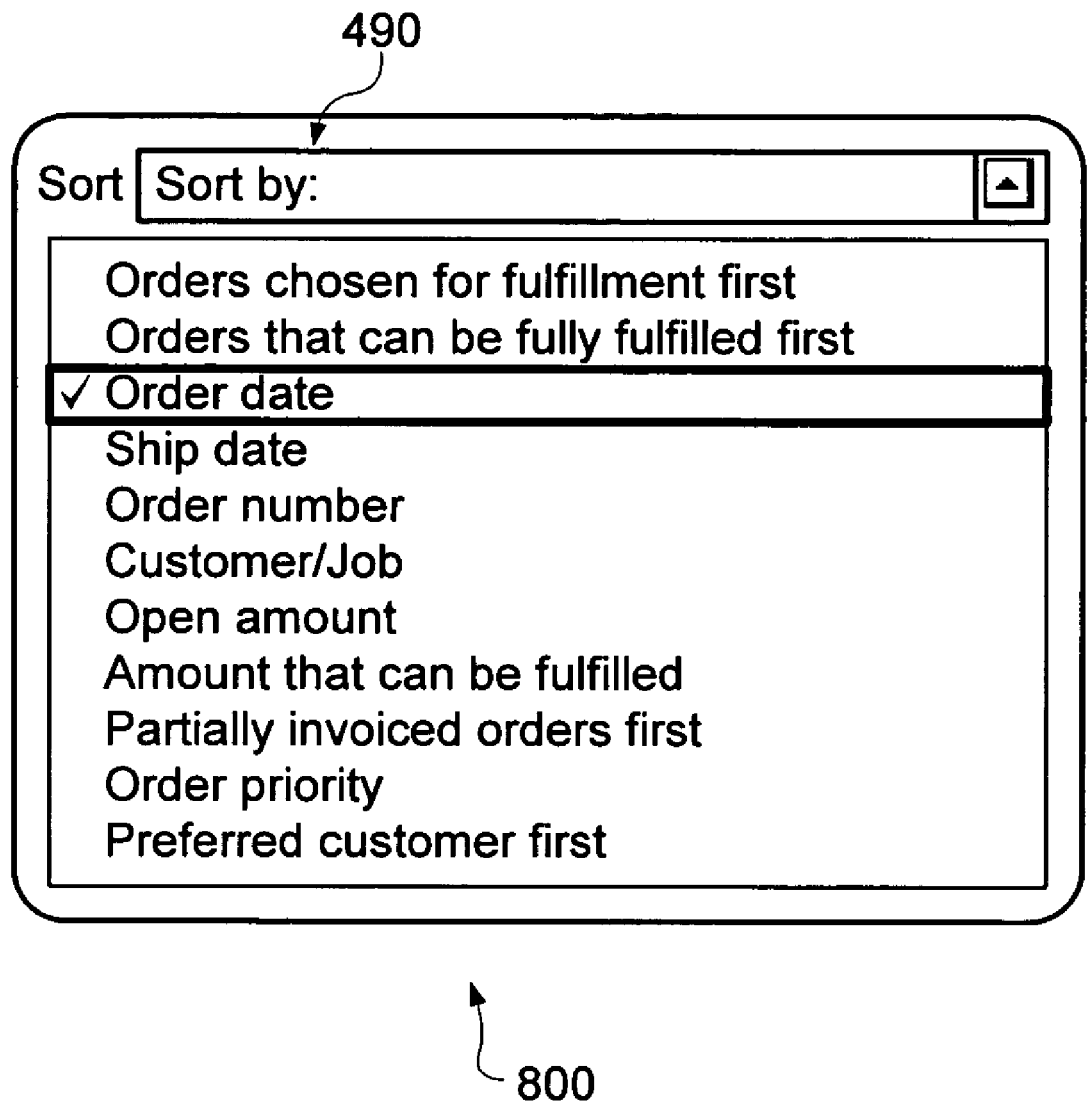
FIG. 8 illustrates an exemplary user interface for an order fulfillment tool allowing a user to indicate how open orders should be sorted, according to one embodiment.

FIG. 8 illustrates an exemplary user interface for an order fulfillment tool allowing a user to indicate how open orders should be sorted, according to one embodiment. As noted above, order fulfillment tool 120 may be configured to sort open orders according to user selected sort criteria. Thus, user interface 490, illustrated in FIG. 4 and described above, may be configured to provide a drop-down menu 800 allowing a user to select how the orders displayed by order fulfillment tool 120 should be sorted. Thus, order fulfillment tool 120 may allow a user to specify whether the orders displayed in table 400 are sorted according to whether or not they can be fulfilled, i.e. orders chosen for fulfillment first, for example. Various different criteria may be used to sort the display of orders in order fulfillment tool 120, according to various embodiments and illustrated in FIG. 8. As with order fulfillment criteria described above, order fulfillment tool 120 may be configured to allow the user to specify the sort criteria in various manners, according to different embodiments. For example, in one embodiment, a user may be able to select from among predefined sort criteria, as illustrated in FIG. 8. In another embodiment, order fulfillment tool 120 may provide a macro language allow a user to textually specify sort criteria. In yet another embodiment, the column headers in row 405 of table 400 may be selected (i.e. clicked) by the user to specify that the orders in table 400 should be sorted according to criteria corresponding to the selected column header. For example, clicking on the Order Date column header of table 400 may result in order fulfillment tool 120 sorting the orders according to their respective order dates. Similarly, clicking on the Open Amount column header may cause order fulfillment tool 120 to sort the orders according to the amount of revenue to be generated by fulfilling each order.

Figure 9:
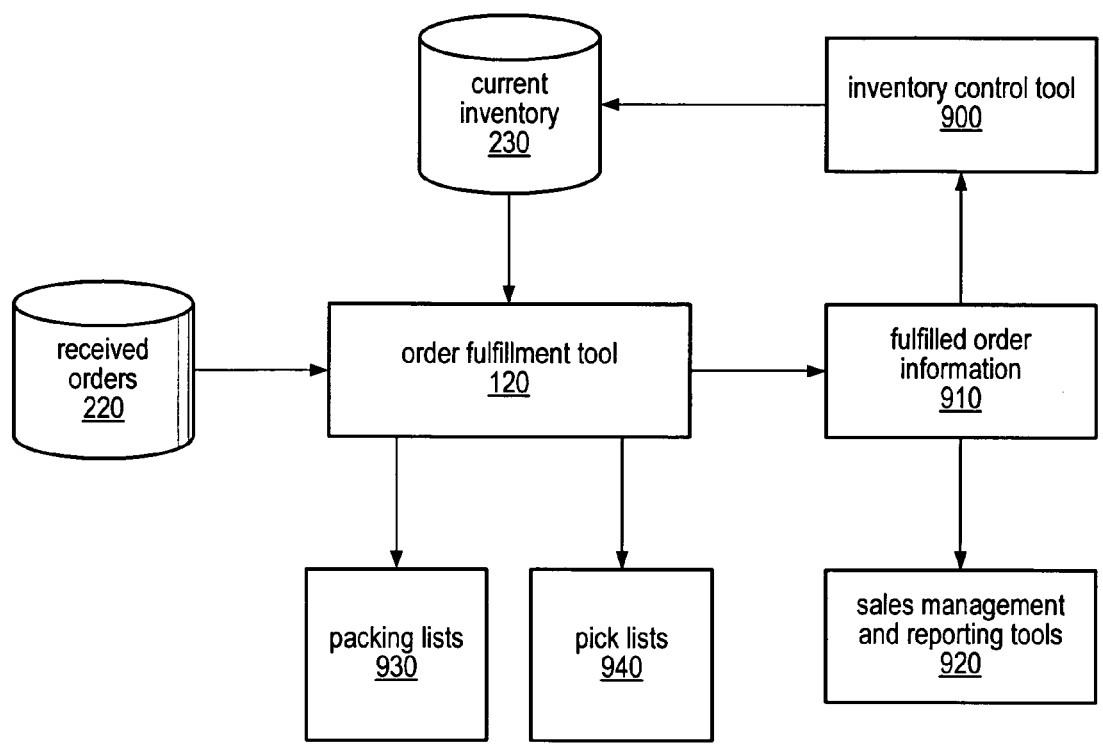
FIG. 9 is a block diagram illustrating an order fulfillment tool communicating order fulfillment information with other tools, according to one embodiment.

FIG. 9 is a block diagram illustrating an order fulfillment tool communicating order fulfillment information with other tools, according to one embodiment. Thus, in some embodiments in addition to generating packing lists 930 and pick lists 940 to aid the actual physical fulfilling and shipping of orders, order fulfillment tool 120 may also communicate with other tools, such as inventory control tool 900 and sales management and/or reporting tools 920 regarding the fulfillment of orders. For example, order fulfillment tool 120 may generate fulfilled order information 910 that may include information regarding any order to be fulfilled, the items used to fulfill those orders and the amount of revenue generated by fulfilling those order, among other information. Order fulfillment tool 120 may communicate fulfilled order information 910 with other tools, such as inventory control tool 900 and sales management and reports tools 920. In some embodiments, the communication between order fulfillment tool 120 and the other tools may be completely automated, while in other embodiments, a user may dictate when and how fulfilled order information 910 is communicated between order fulfillment tool 120 and other tools. Thus, for example, in embodiment, a user may specifically request that order fulfillment tool 120 generate a file containing fulfilled order information 910 and manually load that file into another tool, such as inventory control tool 900. In another embodiment, however, the user may only have to request that order fulfillment tool 120 communicate the information to another tool and order fulfillment tool 120 may automatically take care of all the details of communicating fulfilled order information to the other tool.

Figure 10:
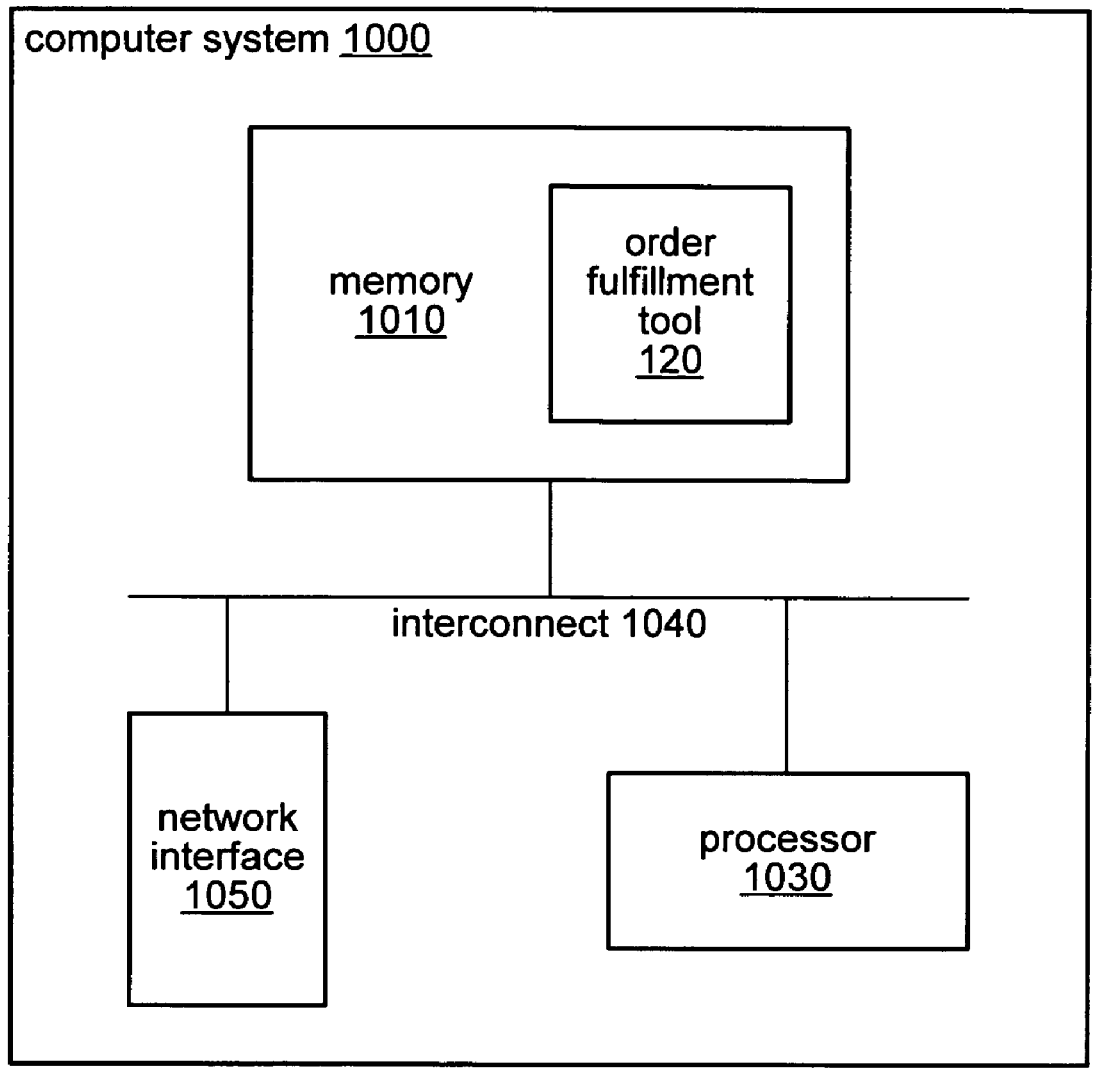
FIG. 10 illustrates a computing system capable of implementing an order fulfillment tool, according to one embodiment.

FIG. 10 illustrates a computing system capable of implementing an order fulfillment tool, such as order fulfillment tool 120, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The described invention may be provided as a computer program product, or software, that may include a computer-readable medium having stored thereon instructions, which may be used to program a computer system (or other electronic devices) to implement an order fulfillment tool according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may includes a processor unit 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the invention may include fewer or additional components not illustrated in FIG. 10 (e.g., video cards, audio cards, storage devices, additional network interfaces, peripheral devices, or other components). The processor unit 1030, the network interface 1050, and the system memory 1010 may be coupled to the interconnect 1040. It should also be noted that one or more components of system 1000 may be located remotely and accessed via a network. One or more of the system memories 1010 may embody an order fulfillment tool 120.

In some embodiments, memory 1010 may include program instructions configured to implement an order fulfillment tool 120, as described herein. Order fulfillment tool 120 may be implemented in any of various programming languages or methods. For example, in one embodiment, order fulfillment tool 120 may be JAVA based, while in another embodiments, it may be implemented using the C or C++ programming languages.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
   a processor;
   a memory operatively connected to the processor; and
   a plurality of software instructions stored in the memory and executable by the processor to implement an order fulfillment tool configured to:
   identify a plurality of orders for a plurality of items;
   display a list identifying a first method for fulfilling orders and a second method for fulfilling orders;
   receive a selection of the first method from a user;
   identify, using the first method, a first plurality of fulfillable orders from the plurality of orders;
   calculate a first plurality of partial fulfillment quantities and a first plurality of expected fulfillment dates for the plurality of orders excluding the first plurality of fulfillable orders;
   output the first plurality of fulfillable orders, the first plurality of partial fulfillment quantities, and the first plurality of expected fulfillment dates;
   receive a selection of the second method from the user;
   identify, using the second method, a second plurality of fulfillable orders from the plurality of orders;
   calculate a second plurality of partial fulfillment quantities and a second plurality of expected fulfillment dates for the plurality of orders excluding the second plurality of fulfillable orders; and
   output the second plurality of fulfillable orders, the second plurality of partial fulfillment quantities, and the second plurality of expected fulfillment dates.

2. The system of claim 1, wherein the first method corresponds to a first-in first-out (FIFO) method.

3. The system of claim 2, wherein the second method corresponds to completing highest revenue orders first.

4. The system of claim 2, wherein the second method corresponds to completing partially fulfilled orders first.

5. The system of claim 1, wherein the order fulfillment tool is further configured to receive a user selection of an order from the plurality of orders and display fulfillability information for an item of the order.

6. The system of claim 5, wherein the order fulfillment tool is further configured to:
   receive user input indicating a fulfillment level for the item of the order; and
   update the second plurality of partial fulfillment quantities according to the indicated fulfillment level.

7. The system of claim 1, wherein the order fulfillment tool is further configured to display fulfillability information for each of the plurality of orders according to a user specified sort order, and wherein the user specified sort order corresponds to at least one selected from a group consisting of order entry date, ship date, and fulfillable amount.

8. A computer implemented method for order fulfillment, comprising:
   identifying, by a processor, a plurality of orders for a plurality of items;
   displaying, by the processor, a list identifying a first method for fulfilling orders and a second method for fulfilling orders;
   receiving, by the processor, a selection of the first method from a user;
   identifying, by the processor and using the first method, a first plurality of fulfillable orders from the plurality of orders;
   calculating, by the processor, a first plurality of partial fulfillment quantities and a first plurality of expected fulfillment dates for the plurality of orders excluding the first plurality of fulfillable orders;
   outputting, by the processor, the first plurality of fulfillable orders, the first plurality of partial fulfillment quantities, and the first plurality of expected fulfillment dates;
   receiving, by the processor, a selection of the second method from the user;
   identify, by the processor and using the second method, a second plurality of fulfillable orders from the plurality of orders;
   calculate, by the processor, a second plurality of partial fulfillment quantities and a second plurality of expected fulfillment dates for the plurality of orders excluding the second plurality of fulfillable orders; and
   output, by the processor, the second plurality of fulfillable orders, the second plurality of partial fulfillment quantities, and the second plurality of expected fulfillment dates.

9. The computer implemented method of claim 8, wherein the first method corresponds to a first-in first-out (FIFO) method.

10. The computer implemented method of claim 9, wherein the second method corresponds to completing highest revenue orders first.

11. The computer implemented method of claim 9, wherein the second method corresponds to completing partially fulfilled orders first.

12. The computer implemented method of claim 8, further comprising:
   receiving a user selection of an order from the plurality of orders; and
   displaying fulfillability information for an item of the order.

13. The computer implemented method of claim 12, further comprising:
   receiving user input indicating a fulfillment level for the item of the order; and
   updating the second plurality of partial fulfillment quantities according to the indicated fulfillment level.

14. The computer implemented method of claim 8, further comprising:
   displaying fulfillability information for each of the plurality of orders according to a user specified sort order, wherein the user specified sort order corresponds to at least one selected from a group consisting of order entry date, ship date, and fulfillable amount.

15. A computer-readable storage medium, comprising a plurality of computer executable instructions for order fulfillment, the plurality of computer executable instructions comprising functionality to:
   identify a plurality of orders for a plurality of items;
   display a list identifying a first method for fulfilling orders and a second method for fulfilling orders;
   receive a selection of the first method from a user;
   identify, using the first method, a first plurality of fulfillable orders from the plurality of orders;
   calculate a first plurality of partial fulfillment quantities and a first plurality of expected fulfillment dates for the plurality of orders excluding the first plurality of fulfillable orders;
   output the first plurality of fulfillable orders, the first plurality of partial fulfillment quantities, and the first plurality of expected fulfillment dates;
   receive a selection of the second method from the user;
   identify, using the second method, a second plurality of fulfillable orders from the plurality of orders;
   calculate a second plurality of partial fulfillment quantities and a second plurality of expected fulfillment dates for the plurality of orders excluding the second plurality of fulfillable orders; and
   output the second plurality of fulfillable orders, the second plurality of partial fulfillment quantities, and the second plurality of expected fulfillment dates.

16. The computer-readable storage medium of claim 15, wherein the first method corresponds to a first-in first-out (FIFO) method.

17. The computer-readable storage medium of claim 16, wherein the second method corresponds to completing highest revenue orders first.

18. The computer-readable storage medium of claim 15, the plurality of computer executable instructions further comprising functionality to:
   receive a user selection of an order from the plurality of orders; and
   display fulfillability information for an item of the order.

19. The computer-readable storage medium of claim 18, the plurality of computer executable instructions further comprising functionality to:
   receive user input indicating a fulfillment level for the item of the order; and
   update the second plurality of partial fulfillment quantities according to the indicated fulfillment level.

20. The computer-readable storage medium of claim 15, the plurality of computer executable instructions further comprising functionality to:
   display fulfillability information for each of the plurality of orders according to a user specified sort order, wherein the user specified sort order corresponds to at least one selected from a group consisting of order entry date, ship date, and fulfillable amount.

* * * * *